(12) United States Patent
Murthy et al.

(10) Patent No.: US 11,561,842 B2
(45) Date of Patent: Jan. 24, 2023

(54) DETERMINING AND IMPLEMENTING A FEASIBLE RESOURCE OPTIMIZATION PLAN FOR PUBLIC CLOUD CONSUMPTION

(71) Applicant: Hewlett Packard Enterprise Development LP, Houston, TX (US)

(72) Inventors: Prabhu Murthy, Bangalore Karnataka (IN); Jyoti Ranjan, Bangalore Karnataka (IN); Abhishek Kumar, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 16/779,358

(22) Filed: Jan. 31, 2020

(65) Prior Publication Data

US 2021/0240539 A1 Aug. 5, 2021

(51) Int. Cl.
*G06F 9/50* (2006.01)
*G06F 8/60* (2018.01)

(52) U.S. Cl.
CPC .............. *G06F 9/5077* (2013.01); *G06F 8/60* (2013.01)

(58) Field of Classification Search
CPC ............ G06F 9/5077; G06F 8/60; G06N 3/08
See application file for complete search history.

(56) References Cited

U.S. PATENT DOCUMENTS

| | | | | |
|---|---|---|---|---|
| 7,693,983 B1* | 4/2010 | Gupta | ..................... | H04L 12/14 709/227 |
| 7,702,779 B1* | 4/2010 | Gupta | ....................... | G06F 9/50 709/224 |
| 10,929,792 B2* | 2/2021 | Binotto | ............ | G06Q 10/06315 |
| 2007/0250838 A1* | 10/2007 | Belady | ................ | G06F 11/3452 714/E11.197 |
| 2014/0068053 A1* | 3/2014 | Ravi | ..................... | G06F 9/5072 709/224 |

(Continued)

OTHER PUBLICATIONS

BMC, "BMC Multi-Cloud Management Solutions", Solution Brief, 2017, 2 pages.

(Continued)

*Primary Examiner* — Benjamin C Wu
(74) *Attorney, Agent, or Firm* — Hewlett Packard Enterprise Patent Department (57) ABSTRACT

Example implementations relate to determining and implementing a feasible resource optimization plan for public cloud consumption. Telemetry data over a period of time is obtained for a current deployment of virtual infrastructure resources within a current data center of a cloud provider that supports an existing service and an application deployed on the virtual infrastructure resources. Information regarding a set of constraints to be imposed on a resource optimization plan is obtained. Indicators of resource consumption relating to the currently deployed virtual infrastructure resources during the period of time are identified by applying a deep learning algorithm to the telemetry data. A resource optimization plan is determined that is feasible within the set of constraints based on a costing model associated with resources of an alternative data center of the cloud provider, the indicators of resource consumption and costs associated with the current deployment.

19 Claims, 7 Drawing Sheets

(56) References Cited

U.S. PATENT DOCUMENTS

| | | | | |
|---|---|---|---|---|
| 2014/0156813 | A1* | 6/2014 | Zheng | H04L 67/10 |
| | | | | 709/220 |
| 2014/0229221 | A1* | 8/2014 | Shih | G06F 9/5038 |
| | | | | 705/7.23 |
| 2016/0094410 | A1* | 3/2016 | Anwar | H04L 67/1097 |
| | | | | 709/223 |
| 2019/0213099 | A1* | 7/2019 | Schmidt | G06F 11/3006 |
| 2019/0324821 | A1* | 10/2019 | Peng | G06F 9/5044 |
| 2019/0340038 | A1* | 11/2019 | Molloy | G06F 9/5088 |
| 2020/0028935 | A1* | 1/2020 | Sahay | G06F 9/5088 |
| 2020/0379816 | A1* | 12/2020 | Lin | G06F 9/5072 |
| 2021/0182106 | A1* | 6/2021 | Wang | G06N 3/08 |

OTHER PUBLICATIONS

Cisco, "Cisco HyperFlex Multicloud Platform", Solution Brief, 2018, 4 pages.

Cloud Technology Partners, "Continuous Cost Control", available online at <https://web.archive.org/web/20190331161707/https://www.cloudtp.com/continuous-cost-control/>, Mar. 31, 2019, 3 pages.

Ferranti, M., "Juniper Multicloud Management Software Targets Enterprise Data Centers", Network World, retrieved from internet https://www.networkworld.com/article/3269310/juniper-multicloud-management-software-targets-enterprise-data-centers.html, Apr. 25, 2018, 4 pages.

HPE, "HPE Unveils Industry's First SaaS-Based Multi-Cloud Management Solution for On- Premises and Public Clouds", available online at, Press Release, Nov. 28, 2017, 9 pages.

Joseph Tsidulko, "Cloud Technology Partners, a Born-in-the-Cloud Solution Provider, Releases Cost and Compliance Control Tools for AWS", CRN, Apr. 2017, 5 pages.

Nutanix, "Cloud Cost Optimization as a Service", Jul. 2019, 2 pages.

Rightscale, "RightScale Cloud Management Platform", Sep. 2018, 6 pages.

\* cited by examiner

DETERMINING AND IMPLEMENTING A FEASIBLE RESOURCE OPTIMIZATION PLAN FOR PUBLIC CLOUD CONSUMPTION

BACKGROUND

Cloud computing has significantly affected the way Information Technology (IT) infrastructure is being consumed. With the help of virtualization technology, it is possible to deploy variety of virtual infrastructure ranging from public cloud environments to on-premise data centers based on native hardware. There are a number of ways to deploy virtualized application infrastructure with virtual machines (VMs) representing one example and the use of containers and microservices representing another.

While the public cloud is often an attractive proposition to start with, production and DevOps use cases tend to result in consumption of more public cloud infrastructure and services over time. If an enterprise is not disciplined about its cloud resource consumption, inefficient public cloud resource utilization can result in a costlier cloud-based solution than a comparable on-premise solution.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to determining and implementing a feasible resource optimization plan for public cloud consumption. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

While the use of the public cloud can provide enormous benefits, as a result of various human behavioral tendencies and technical inefficiencies, public cloud resources are often not used in an optimal manner. For example, some cloud users still operate in accordance with the private data center model to which they have become accustomed over the years in which an IT administrator monitors compute resources on their behalf. This leads to a pattern in which a lack of discipline may exist regarding resource consumption (e.g., failing to delete resources when they are no longer needed). Another common oversight on the part of cloud users relates to the failure to think of the public cloud billing meter as running 24×7, 365 days a year regardless of actual usage. For example, it does not matter whether an Amazon Web Services (AWS) instance (or VM) serving a specific application uses compute resources over the weekend or during a long vacation. AWS charges for a VM as long as it remains provisioned. Lack of insight is another hurdle. As a result of the number of types of services, the different cost models for different data centers, and lack of deep insight regarding costs being incurred due to consumption of public cloud services and data, it becomes difficult to optimize resource utilization effectively. As such, cloud users may become lost and are unable to decipher for what they are paying despite the pay-as-you-consume theory of the cloud. The optimization problem effectively represents a puzzle too difficult to solve without an analytic based computer solution. Finally, the nature of an enterprise's budgeting process and its lack of visibility across business units may contribute to inefficient use of public cloud resources. For example, as long as the various business units are operating within their respective budgets, there may be no real motivation to work together to identify potential efficiencies that might be able to be achieved.

Meanwhile, existing solutions are not meeting the needs of cloud users. Existing tools implemented by cloud providers may assist administrators with various issues, such as understanding the current cost of an account and performing cost forecasting based on past and current consumption. Third-party tools, such as cost calculators, provide some assistance in connection with determine how much it would cost to deploy same infrastructure across different vendors (e.g., performing cost comparisons among AWS, Azure, and/or Google). There is no tool, however, that seeks to understand an application's consumption behavioral pattern by tracking already deployed infrastructure and then providing feasible and actionable advice on how to consume the public cloud in an optimized way. There is no solution that helps an IT cost manager holistically to, among other things:

Detect a virtual infrastructure pattern so that similar infrastructure can be deployed with lesser cost in another data center by the same cloud vendor. Or, at least services can be decomposed to allow some portion of an application to use a less costly data center. For example, it might be more efficient to run a core application in AWS US East, but move backup functionality to AWS Asia Pacific for cold data (as cold data changes less frequently and hence slower data accessibility may be acceptable).

Detect resources (often expressed in VM size, such as m1.tiny, m1.large, and the like) which is underutilized.

Detect idle resources (e.g., provisioned but not being used).

Detect a spike of in application workload and provide a notification that the compute environment does not need a VM of large size at all times, but rather for only a certain period of time, which can be easily achieved by re-sizing an instance for during the appropriate times. For example, an e-retailer's order application may be well served by a VM of medium size (e.g., m1.medium) for most of the year except during the holiday season in which there is a likelihood of bursts of customer requests. At that point of time, a VM of large size (e.g., m1.large) may be more suitable.

Detect data generation patterns and indicate that there is no perceived benefit to maintaining X-days of backups instead Y-days; or, that there is no point in performing backups during a certain time period at the same frequency as normal scenarios. For example, data generated by students within a university IT infrastructure is almost zero during school breaks. So, there is no point in performing backup operations at the typical frequency during such breaks.

Embodiments described herein seek to address various shortcomings of existing solutions by determining and implementing a feasible resource optimization plan for public cloud consumption based on currently deployed resources, observed behavior patterns, available options, and preferences/constraints specified by the administrator. According to various embodiments described herein, a bottom up approach is implemented in which resource utilization of a current deployment of virtualized infrastructure is analyzed to learn behavior and usage patterns that might reveal a better way of consuming public cloud resources that essentially maintains the same IT functionality but with increased resource usage efficiency and cost reductions. In one embodiment, a resource optimization system provides detailed insight regarding expenses incurred over a period of time and makes suggestions with respect to how an IT cost manager might be able to maintain the same level of IT functionalities with a different and more efficient configuration of public cloud resources, thereby reducing expenditures on public cloud resources.

In one embodiment, the resource optimization system seeks to understand one or more of the following aspects relating to public cloud resource utilization:
  Users' behavioral patterns of consuming public cloud resource
  Application resource utilization pattern
  Discovery of unutilized resources
  Discovery of inefficiently utilized resources
  Exploring alternate data centers in which similar functionalities can be achieved at lesser cost.

As described in further detail below, in one embodiment, the resource optimization system collects a set of data points (e.g., user requests, monitoring metrics, alerts, and the like) over a period of time. The system may then apply behavior and consumption analytics to the collected set of data points to generate various reports and/or optimization plans including information regarding one or more of the following:
  Current cost
  Cost trend over a period of time indicating ideal cost as well as actual cost for consumed services and infrastructure
  A list of resources being used inefficiently and/or utilized resources causing leakage in cost
  A strategy for implementing the virtual computing infrastructure by migrating it (or some portion of it) to other data center of the same public cloud provider.

While for the sake of example various embodiments are described herein with reference to AWS instance types, those skilled in the art will appreciate the methodologies described herein are equally applicable to other public cloud providers and to other resource virtualization mechanisms.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrase "virtual infrastructure" generally refers to a set of virtualized infrastructure resources that an application makes use of as part of its operation. For example, a virtualized form of an application can be run on virtualized infrastructure resources (e.g., VMs) or within containers. Non-limiting examples of a virtualized infrastructure resources include VMs, containers, compute resources, storage resources, and network resources. In various embodiments described herein, a currently deployed virtual infrastructure is evaluated in an attempt to identify a more efficient way to utilize the existing virtualized infrastructure resources and/or to migrate all or some subset to a different data center of a public cloud provider.

Figure 1:
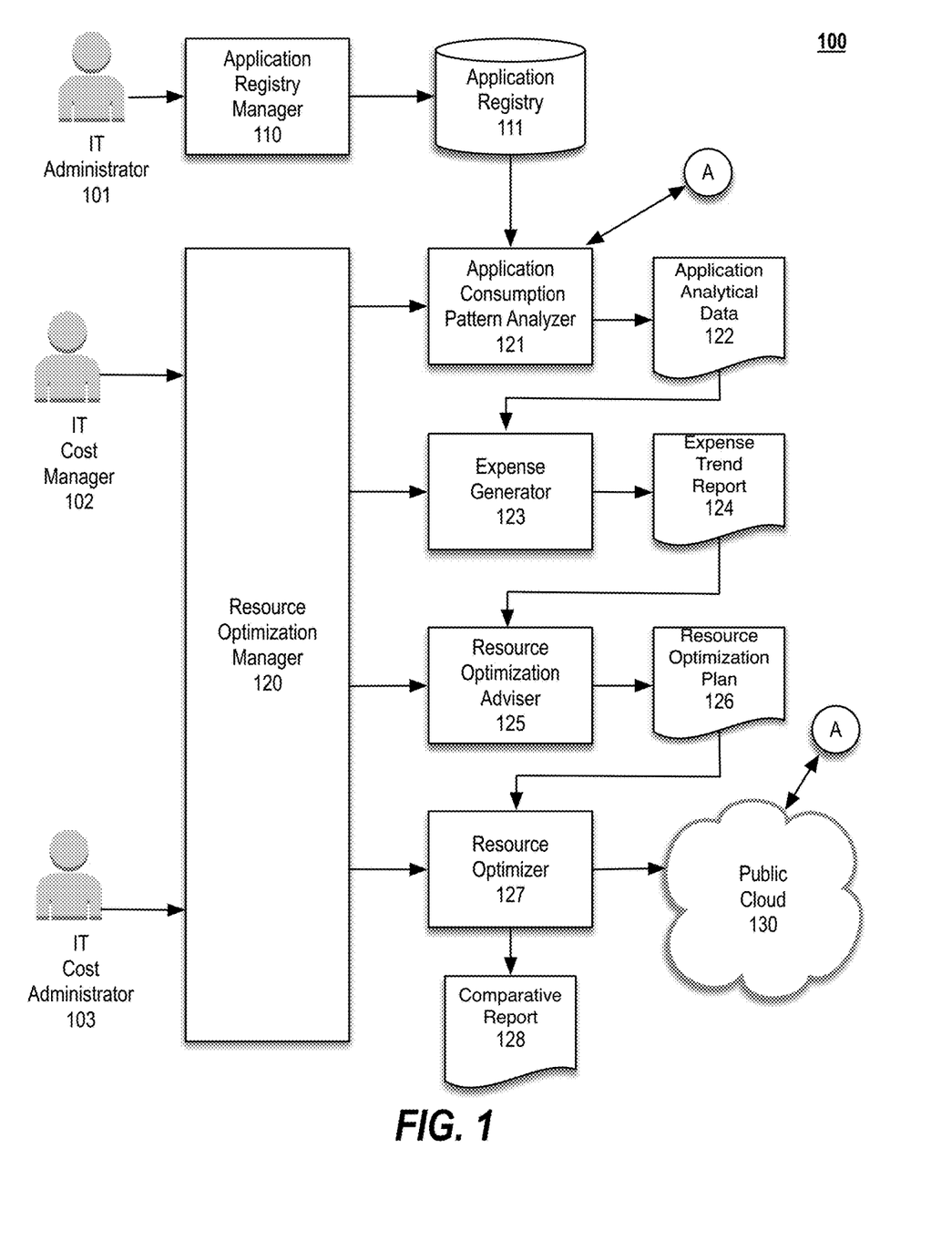
FIG. 1 is a block diagram illustrating various components of a resource optimization system in accordance with an embodiment.

FIG. 1 is a block diagram illustrating various components of a resource optimization system 100 in accordance with an embodiment. In the context of the present example, the resource optimization system 100 includes an application registry manager 110, an application registry database 111, a resource optimization manager 120, an application consumption pattern analyzer, an expense generator 123, a resource optimization adviser 125, and a resource optimizer.

In one embodiment, the application registry manager 110 is responsible for initializing the resource optimization system 100 and providing appropriate data to facilitate the various processes associated with performing resource optimization for a currently deployed virtual infrastructure within a public cloud 130. In the context of the present example, an IT administrator is shown interacting with the application registry manager 100 to provide the application registry manager 100 with a list of applications and target cloud details. Non-limiting examples of the type of data that may be collected by the application registry manager 110 and persisted to the application registry database 111 include the following for each application (which may be persisted together or separately using different persistent mechanisms (e.g., SQL or no-SQL databases) depending on the particular implementation):
  Application attributes (e.g., service level agreement (SLA) parameters, whether there are availability or high availability (HA) requirements, and disaster recovery conditions)
  Information regarding deployed virtual infrastructure (e.g., details regarding consumed services and/or virtual infrastructure)
  Reference to files and credentials for accessing historical telemetry data (e.g., logs, alerts and monitoring data)
  Application preferences or constraints. For example, the application is desired to be hosted entirely in AWS US East Backup attributes (whether backups are desired, frequency and the like)

Cloud services attributes (e.g., AWS relational database service (RDS) attributes)

Cloud cost details (e.g., cloud costing models for different data centers of the public cloud provider)

Any other constraints and/or preferences, if any

With respect to the application consumption pattern analyzer 121, it may be triggered responsive to a request by an IT cost manager 120 to the resource optimization manager 120 to prepare a resource optimization plan 126. Responsive to receipt of the request from the IT cost manager 102, the resource optimization manager 120 may invoke the application consumption pattern analyzer 121 to initiate application behavioral analysis. According to one embodiment, the application consumption pattern analyzer 121 is responsible for learning and/or deriving (e.g., by way of deep analytics and/or a deep learning algorithm) information about various aspects of the currently deployed virtual infrastructure, including discovering inefficient utilization of resources and discovering zombie resources, and generating application analytical data 122 for use by the expense generator 123. For example, the application consumption pattern analyzer 121 may, using the application registry database 111 as an input, learn information regarding one or more of the following:

The current and historical consumption trends

The cost trend over time

User workload pattern

In regards to learning information relating to current and historical consumption trends, non-limiting examples of such information includes the current and historical allocation of resources (e.g., in terms of central processing unit (CPU), RAM, persistent disk storage (e.g., number of AWS elastic bock store (EBS) volumes), database (e.g., AWS RDS instances and sizes) and the like); the minimum and peak consumption of allocated resources and when and how frequently they have occurred; the average consumption of allocated resources; the growth rate in consumption of allocated disk storage; whether the application data is to be backup; and, if so, with respect to the persistent volume, how frequently backups are performed (e.g., snapshots taken), the amount of data that is being backed up, the recycling policy, and the consumption pattern of snapshots; and, similar information with respect to the database instances, including the size of the database instances, the restoration pattern of the RDDS instances and whether secondary backup are performed (e.g., in ASW S3) or have ever been performed.

In regards to learning information relating to user workload pattern, non-limiting examples of such information includes the minimum, average, and peak workloads observed and when they occur; the nature of any SLA agreement; whether there is any flexibility in relation to any of the SLA parameters (e.g., to allow usage of fewer resources by all or a subset of the applications); whether any applications are being used only at certain times (e.g., promo applications, which typically run during holidays); the ability to dynamically re-size compute requirements of applications at certain times by leveraging auto-scaling features supported by most public cloud vendors instead of up-front provisioning of a large amount of resources.

Turning now to the expense generator 123, after the application consumption pattern analyzer 121 has generated the application analytical data 122, the resource optimization manager 120 may request the expense generator 123 to perform an expense calculation over a particular period of time. In one embodiment, the default period of time is 30 days so that it aligns with the monthly billing cycle for virtual infrastructure or services consumed by the team, business unit or company at issue and the expense generator 123 may re-run the expense calculation periodically every default period of time. In embodiments, the period of time can be overridden by the IT administrator, for example, for a different set of virtual infrastructure within the same business unit. For instance, if data is being generated at very slow pace, then the IT administrator may desire to have at least a quarter of data to accumulate to better understand the access pattern. Another example in which the IT administrator may wish to override the default period of time is VM vending. If the VMs are more or less the same, then evaluation of resource consumption over a longer period may produce better results over a shorter duration.

According to one embodiment, is responsible for determining one or more of the following aspects relating to the currently deployed virtual infrastructure based at least in part upon the application analytical data 122:

Currents cost

Current resource utilization

Ideal cost (based on actual resource utilization). According to one embodiment, the expense generator 123 runs periodically and crawls the deployed virtual infrastructure to update the above noted metrics within an expense trend report 124.

After the expense generator 123 has generated the expense trend report 124, the resource optimization adviser 125, in one embodiment, is invoked by the resource optimization manager 120 to provide advice regarding feasible resource optimizations (e.g., optimizations that are possible within the given constraints). According to one embodiment, the resource optimization adviser 125 is responsible for evaluating various aspects of the cloud provider costing model as applied to the currently deployed virtual infrastructure to determine various resource optimizations that can be applied to achieve substantially the same IT result as the currently deployed virtual infrastructure, but with a more efficient utilization of resources and an associated lesser cost. The resource optimization adviser 125 may evaluate one or more of the following:

The currently deployed virtual infrastructure

Cost billed by the public cloud vendor providing the currently deployed virtual infrastructure Application behavior patterns as generated by the application consumption pattern analyzer 121

Expense reports (actual and ideal) as generated by the expense generator 123

Alternate opportunities to have some portion of the virtual infrastructure be deployed to an alternative data center of the same cloud provider to achieve efficiencies and reduced cost.

The lifecycle of the application

In one embodiment, based on above data, the resource optimization adviser 125, applies analytics to identify resource efficiency opportunities relating to one or more of the following:

Resources that can be tuned be more efficient so as to yield less cost by using less resources (e.g., usage of m1.medium instead of m1.large for a currently under-utilized VM instance)

Reducing backup frequency

Usage of EBS volumes of lower Input/Output operations per second (IOPS) if the current EBS volumes never hit the high TOPS assumed by the initial configuration of the virtualized infrastructure.

Resource optimized migration of certain aspects of the currently deployed virtual infrastructure to another, but alternate eco-system or more cost-effective data center of the same public cloud provider.

Segregation of cold and hot data. For example, cold data may be capable of being migrated to an archival system/service (e.g., AWS S3 Glacier).

Ability to move storage of backup data from one location to another (e.g., storage of backup data in AWS Asia Pacific data center rather than AWS US East).

Reduced frequency of EBS volume snapshots if the current frequency it is not adding value Optimized order. For example, the resource optimization adviser 125 may:

Recommend use of reserved instances for a specific application it runs 24×7 365 days If there are a sufficient number of applications for which reserved instances are appropriate, then a recommendation may be made to request to place a bulk order or negotiate for it.

A resource optimization plan 126

Turning now to the resource optimizer 127, in the context of the present example, after the resource optimization plan 126 has been approved by the IT cost manager 102 and/or an IT cost administrator 103, the IT cost administrator issues a request to the resource optimization manager 120 to re-deploy and reconfigure the consume services and application to achieve the proposed resource optimizations. In one embodiment, the resource optimizer 127 is called by the resource optimization manager 120 to align the consumed virtual infrastructure or services to realize the resource optimizations proposed in the resource optimization plan 126. Depending upon the proposed resource optimizations, some may be in the form of suggestions sent to one or more of the IT administrator 101, the IT cost manager 102, and the IT cost administrator 103 and some may be capable of being performed programmatically by the resource optimizer 127 providing appropriate directives to the public cloud 130. For example, the resource optimizer 120 may issue appropriate calls to an API of the public cloud 130 to reconfigure existing services and the deployed application, re-deploy the application to implement one or more proposed resource optimizations, and/or segregate data and virtual infrastructure across different data centers of the public cloud provider to achieve one or more proposed resource optimizations (e.g., due to geographical location). Additionally or alternatively, the resource optimizer 127 may send a cost negation plan with information to facilitate negotiation by the IT const administrator 103 with the public cloud provider for reduced cost based on data generated by the resource optimization system 100.

According to one embodiment, the resource optimizer 127, is responsible for, based on the resource optimization plan 126 and with the approval of the IT cost administrator 103, starting the process of executing the resource optimization plan 126 by performing one of more of the following:

Re-deploy or re-configure compute instances with lower configurations

Migrate and/or segregate cold and hot data to different services (e.g., cheaper in cost) or to alternate data centers Reduce backup frequency Send an automated notification (e.g., via text message, email or otherwise) to the IT cost administrator 103 recommending they negotiate with the cloud vendor in an attempt to obtain a discount based on the data (e.g., ideal cost) and/or recommendations (e.g., bulk order discount) provided by the resource optimization adviser 125.

Prepare a holistic report of earlier cost, current cost after optimization and future cost based on historical trend in the form of a comparative report 128.

While in the context of the present example, the IT administrator 101, the IT cost manager 102, and the IT cost administrator 103 are shown separately, those skilled in the art will appreciate that two or more of such roles may be one and the same.

The processing described below with reference to the flow diagrams of FIGS. 4-6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 7 below.

While for sake of brevity, certain actions may be described with reference to the flow diagrams of FIGS. 4-6 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 2:
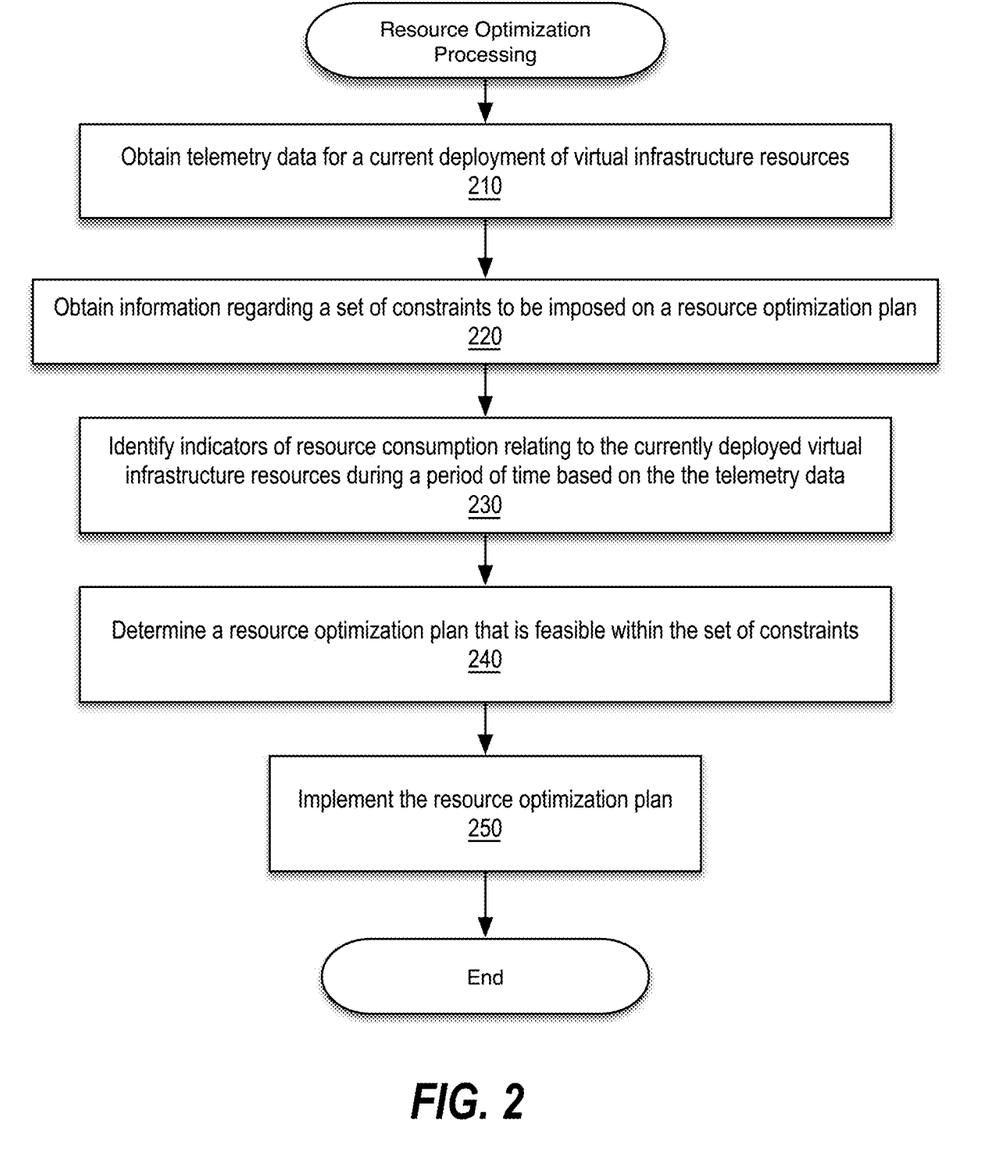
FIG. 2 is a high-level flow diagram illustrating resource optimization processing in accordance with an embodiment.

FIG. 2 is a high-level flow diagram illustrating resource optimization processing in accordance with an embodiment. At block 210, telemetry data is obtained for a current deployment of virtual infrastructure resources that are to be analyzed for potential resource optimizations. According to one embodiment, the telemetry data regarding the current deployment is retrieved from the public cloud (e.g., public cloud 130) based on information provided by an administrator (e.g., IT administrator 101) during registration of a list of applications with the resource optimization system (e.g., resource optimization system 100) via an application registration process (e.g., performed by application registry manager 110). The telemetry data may represent historical telemetry data collected over a period of time (e.g., 30, 60, or 90 days). In one embodiment, the telemetry data is collected over the same period of time as the expense calculation described above. Non-limiting examples of the telemetry data that might be obtained includes monitoring metrics (e.g., resource consumption over time, workload over time, and the like), logs, configuration of the public cloud resources (e.g., CPU configuration, RAM configuration, storage configuration over time).

At block 220, information is obtained regarding a set of constrains to be imposed on a resource optimization plan. For example, the IT administrator may specify preferences and/or constraints that a particular application be hosted in a particular geographical region. Other non-limiting examples of potential preferences and/or constraints that might be specified include (i) choosing storage media of lower cost within a data center of a particular country (e.g., AWS US EAST or AWS US WEST) to keep data within a particular geographical region despite the potential for lower cost outside of the particular geographical region (e.g., AWS APJ); (ii) use of bulk provisioning only if the resulting savings would be more than a particular percentage (e.g., 10%) in order to avoid the IT administrative overhead of re-provisioning unless the savings is deemed worthwhile; and (iii) imposing limits on system proposed reduction of resources like CPU or memory for certain applications to a particular percentage (e.g., 10%, 20%, 30%).

At block 230, a set of indicators of resource consumption over a period of time are identified relating to the currently deployed virtual infrastructure resources based on the telemetry data. According to one embodiment, the indicators of resource consumption include one or more of current and historical consumption trends, a cost trend over time and a user workload pattern that are identified by performing deep analytics and/or a deep learning algorithm on the telemetry data. In one embodiment, an Artificial Neural Network (ANN)-based deep learning algorithm is trained to capture non-linear patterns in the telemetry data by adding layers of parameters to the model.

At block 240 a feasible resource optimization plan is determined that can be implemented within the set of constraints. According to one embodiment, a resource optimization adviser (e.g., resource optimization adviser 125) evaluates various aspects of a costing model of the public cloud provider with respect to the currently deployed virtual infrastructure to identify various resource optimizations that that can be performed while maintaining substantially the same IT result as the currently deployed virtual infrastructure.

At block 250, the resource optimization plan is implemented. In one embodiment, some aspects of the resource optimization plan (e.g., resource optimization plan 126) are capable of being programmatically implemented by a resource optimizer (e.g., resource optimizer 127) providing appropriate directives to a public cloud (e.g., public cloud 130) and other aspects (e.g., negotiation with the public cloud provider for a bulk order discount) may be more appropriate for implementation by an administrator.

Figure 3:
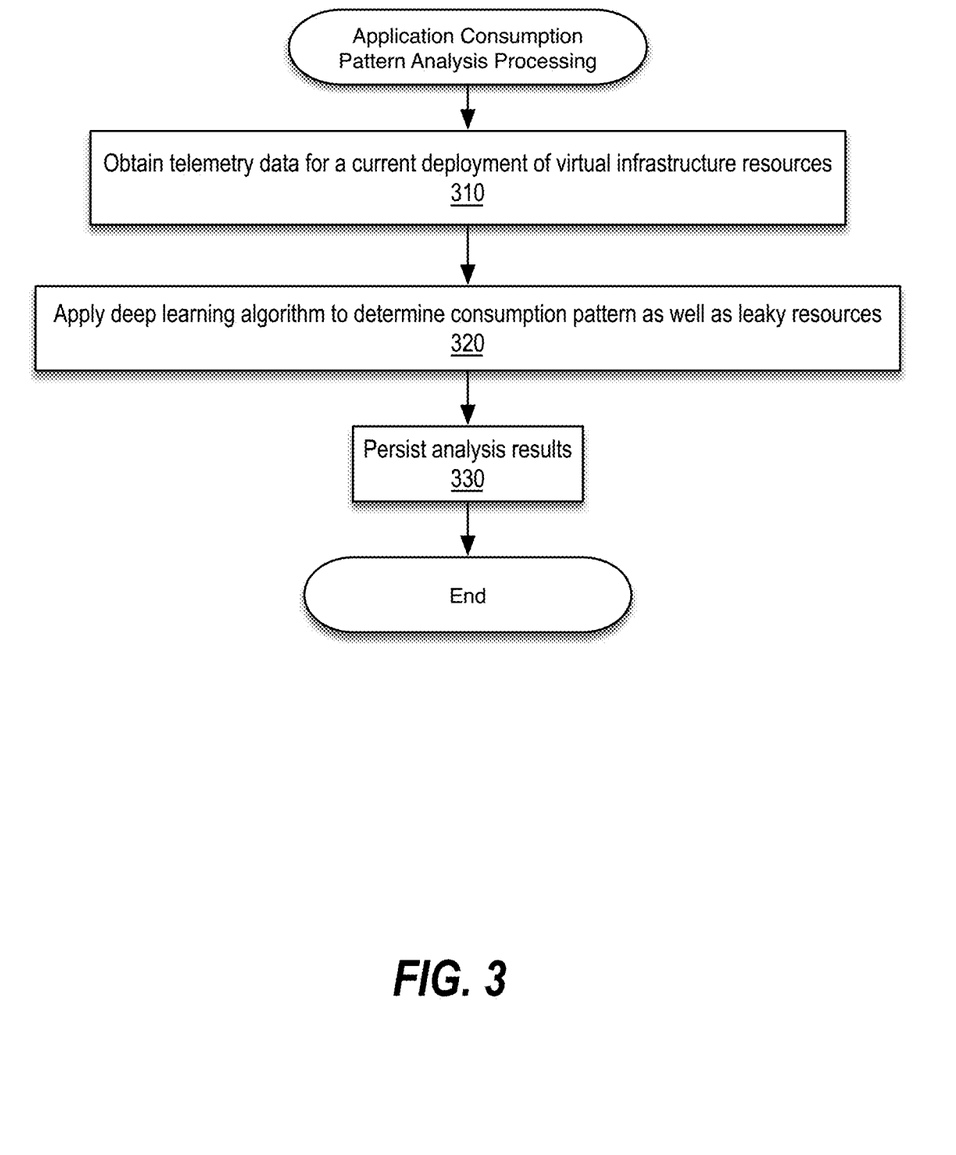
FIG. 3 is a flow diagram illustrating application consumption pattern analysis processing in accordance with an embodiment.

FIG. 3 is a flow diagram illustrating application consumption pattern analysis processing in accordance with an embodiment. According to one embodiment, the application consumption pattern analysis processing is performed by an application consumption pattern analyzer component (e.g., application consumption pattern analyzer 121) of the resource optimization system.

At block 310, telemetry data may be obtained for a current deployment of virtual infrastructure resources that are to be analyzed for potential resource optimizations as described above with reference to block 210 of FIG. 2. In one embodiment, the a resource optimization system (e.g., resource optimization system 100) initiates deep learning by invoking a representational state transfer (REST) API of the application consumption pattern analyzer, which may be implemented in the form of a microservice.

At block 320, a deep learning algorithm is applied to the telemetry data to determine a consumption pattern as well as leaky resources. In one embodiment, one or more of the following aspects are considered in connection with identifying leaky resources:
  Instances that have not been used for a predetermined or configurable time period (e.g., 30, 60, 90 days)
  The ability of delete unused/infrequently used resources or the ability to schedule infrequently used resources to be instances on-demand and re-cycled after usage if deletion is not a good solution
  The existence of instances running below average workload most of the time and whether an instance flavor of smaller size might be reasonable
  Whether volume snapshots are being taken too frequently
  The ability to reduce the number of snapshots According to one embodiment, the deep learning algorithm is applied by the application consumption pattern analyzer 121 and identifies various aspects of the consumption pattern over a period of time. According to various embodiments, one or more of the following aspects of the current deployment are evaluated:
  Whether reserved instances can be used in place of spot instances for long-lived applications as reserved instances may be on the order of 30% less expensive depending upon the particular cloud service provider
  Whether a bulk order of reserved instances might be an option to obtain an discount and whether workload can be re-deployed to make such a bulk order possible
  Whether backup data can be stored in lower cost data center
  Whether data can be categorizes (especially in case of objects storage) as hot and cold and whether cold data can be stored in a lower cost objects storage solution (e.g., AWS Glacier vs. AWS S3)

For example, the results of the deep analytics by the deep learning algorithm may provide information regarding average, minimum and maximum compute utilization, the lifespan of launched applications, data consumption patterns in terms of TOPS, volume snapshot creation and associated utilization data, backup creation and associate utilization data, data usage patterns (e.g., cold vs. hot data), the provisioning model used to create instances (e.g., reserved vs. spot), user workload pattern, and cloud services consumption pattern (e.g., for AWS S3, AWS RDS, etc.)

At block 330, the analysis results are persisted. According to one embodiment, the analysis results are persisted in the form of application analytical data 122.

Figure 4:
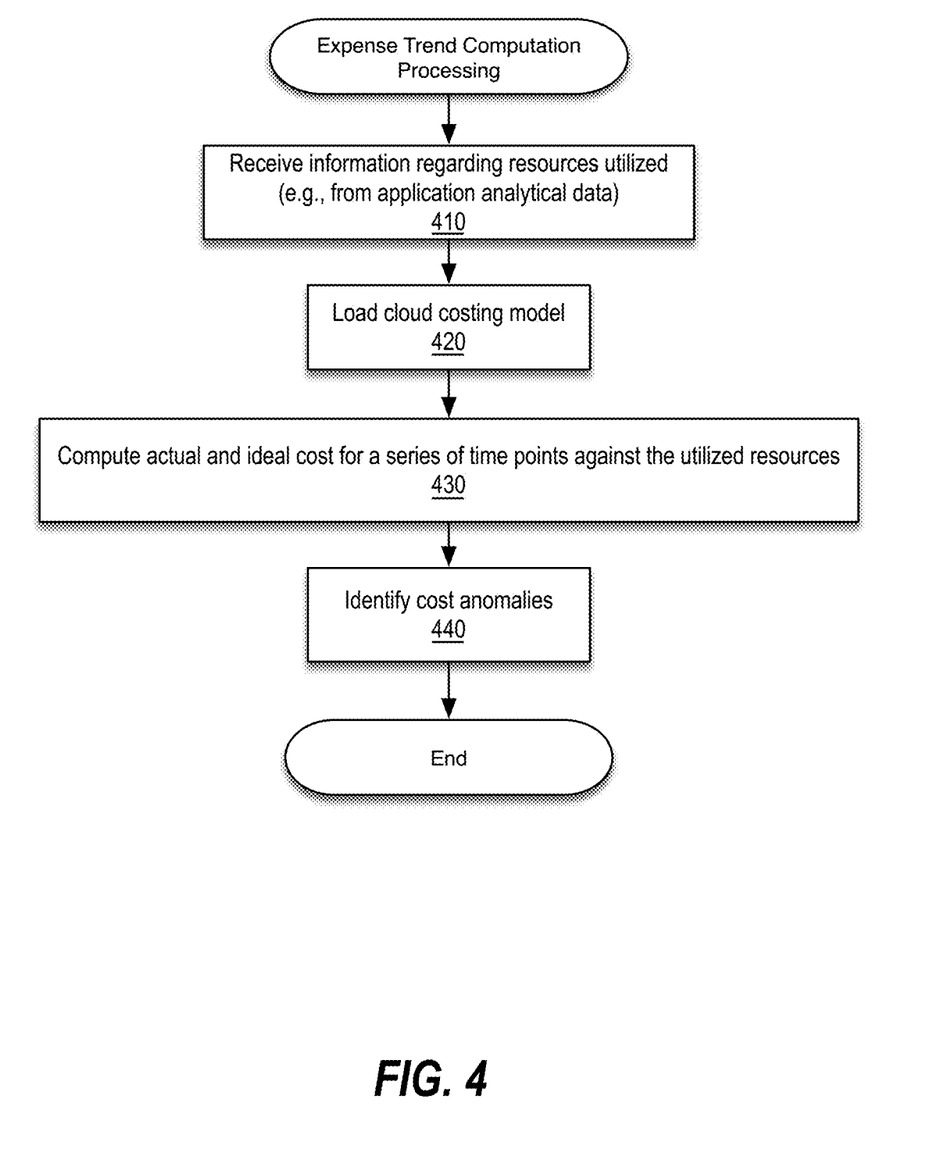
FIG. 4 is a flow diagram illustrating expense trend computation processing in accordance with an embodiment.

FIG. 4 is a flow diagram illustrating expense trend computation processing in accordance with an embodiment. According to one embodiment, the expense trend computation processing is performed by an expense generator (e.g., expense generator 123).

At block 410, information is received regarding resources utilized as part of a current deployment of virtualized infrastructure within a public cloud. In one embodiment, the resource optimization system initiates the process of determining the actual cost and the ideal cost against a utilized resource for every application an cloud service consumed by the current deployment by invoking the expense generator, which retrieves or is invoked with resource utilization attributes. The resource utilization attributes may represent a subset of information (e.g., the application analytical data 122) generated by previous application consumption pattern analysis component (e.g., by the application consumption pattern analyzer 121) of the resource optimization system.

At block 420, the cloud costing model is loaded. According to one embodiment, the expense generator retrieves the cloud costing model from the public cloud provider based on information (e.g., within the application registry database 111) provided by the IT administrator.

At block 430, the actual and ideal cost for a series of time points are computed against each utilized resources. According to one embodiment, the ideal cost represents what ideally would have been paid if pay-per-use were applied by the cloud service provider's cost model at a very fundamental level based on actual usage. In one embodiment, ideal cost is calculated by subtracting the cost of any unutilized portion of a virtualized infrastructure resource from the actual cost incurred. For example, if a VM is observed to be consuming 70% CPU on average, the ideal cost is 30% less than what is being expended at present as ideally there should be minimal to no underutilization of virtualized infrastructure resources. Whether this ideal cost is representative of reality is not of concern as this metric is simply used in various embodiments to identify potential cost deviations/anomalies and get some idea of what is happening in the context of the currently deployed virtual infrastructure to feed proper input to the next step in the optimization process (e.g., resource optimization adviser 125).

At block 440, cost anomalies are identified. According to one embodiment, the difference between the actual cost and ideal cost is used to identify cost anomalies. For example, a difference exceeding a predetermined or configurable threshold may be used to flag the utilization of the resource at issue to be considered for further optimization analysis. Additionally or alternatively, anomalies may be identified based on a spike in cost (e.g., as a result of specific data, user workload, and/or application pattern) over the period of time being evaluated. Any identified anomalies may be persisted (e.g., in the expense trend report 124) for downstream processing.

Figure 5:
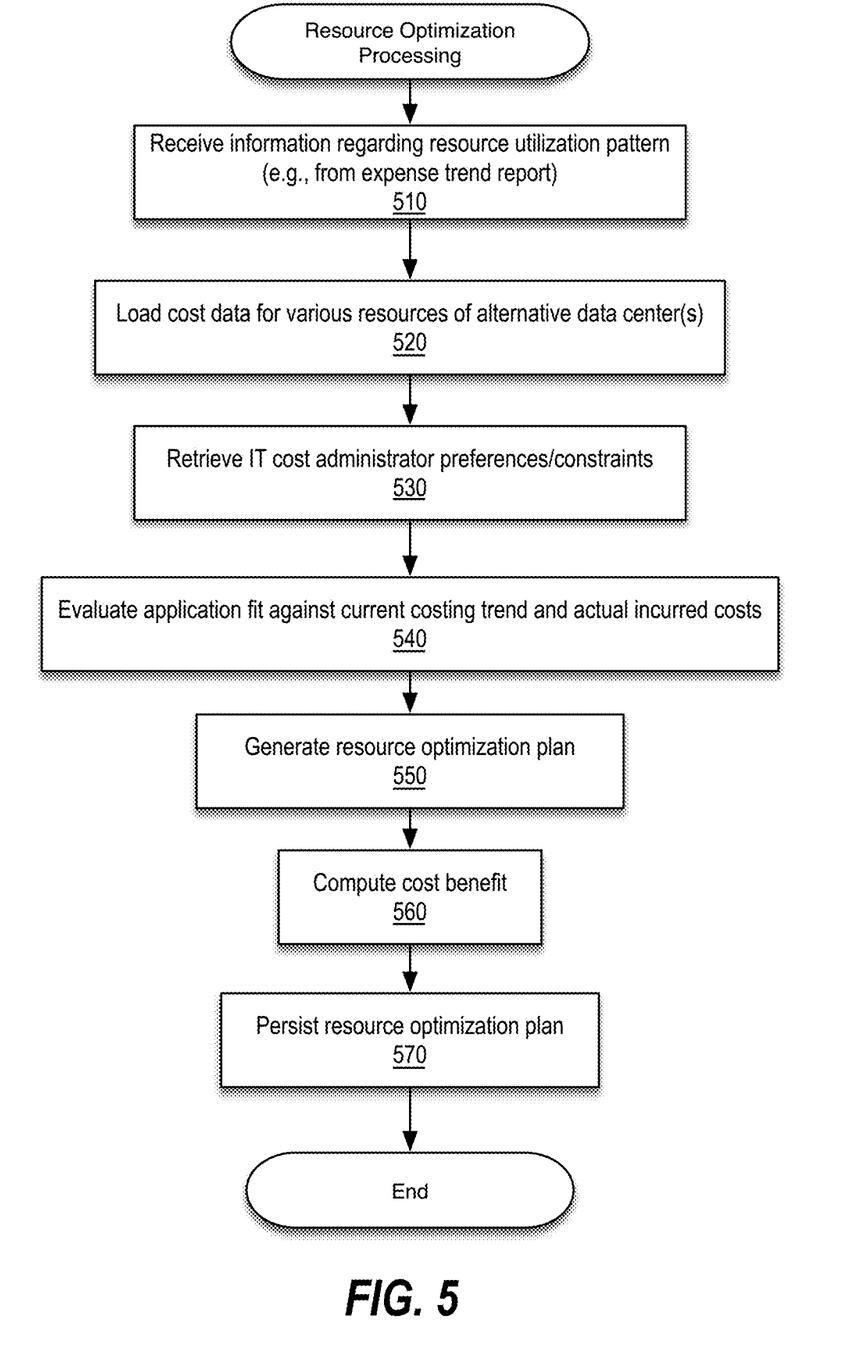
FIG. 5 is a flow diagram illustrating resource optimization plan generation processing in accordance with an embodiment.

FIG. 5 is a flow diagram illustrating resource optimization plan generation processing in accordance with an embodiment. According to one embodiment, the resource optimization plan generation processing is performed by a resource optimization adviser component (e.g., resource optimization adviser 125) of the resource optimization system.

At block 510, information regarding the resource utilization pattern of the currently deployed virtualized infrastructure within the public cloud is received. According to one embodiment, the resource optimization adviser is invoked with this information as a parameter or retrieves this information from the results (e.g., application analytical data trend report 124). of processing performed by the application consumption pattern analyzer.

At block 520, cost data is loaded for various resources of one or more alternative data centers (e.g., data centers associated with the current cloud provider). In one embodiment, this information was previously input by the IT administrator at the time of application registration and can be retrieved from the application registry database 111. Alternatively, this information may be retrieved directly from the current public cloud service provider.

At block 530, administrator preferences/constraints are retrieved. In one embodiment, this information was previously input by the administrator at the time of application registration and can be retrieved from the application registry database 111.

At block 540, the application fit against the current costing trend and actual incurred costs is evaluated. According to one embodiment, a determination is made regarding whether the application is trending towards over or under utilization of any of the resources relied upon by the application.

At block 550, a resource optimization plan is generated. According to one embodiment, based on the previous analysis (e.g., by the application consumption pattern analyzer and the expense generator), various recommended application and service specific resource optimizations are identified. Non-limiting examples of the types of recommendations that might be included within the resource optimization plan (e.g., resource optimization plan 126) include reducing volume snapshot frequency, segregating cold and hot data, deletion of idle resources, reconfiguration of a service (e.g., use m1.medium instead of m1.large for a particular application with auto-scale enabled), moving backup functionality from one geographical region to another, and re-provisioning an instance as a reserved instance instead of a spot instance.

At block 560, a cost benefit is computed. According to one embodiment, the cost benefit reflects cost savings based on the actual cost before the recommended optimizations and the expected cost after implementing the recommended optimizations.

At block 570, the resource optimization plan is persisted. According to one embodiment, the resource optimization plan includes recommended resource optimization actions for each application and service. The resource optimization plan may also include information regarding actual cost, revised cost post optimization and savings percentage. In this manner, the administrator can make an informed decision regarding whether to approve the various recommended resource optimizations. In one embodiment, the resource optimization plan includes sufficient information to allow subsequent downstream processing to programmatically implement one or more of the recommended resource optimizations (if approved by the administrator).

Figure 6:
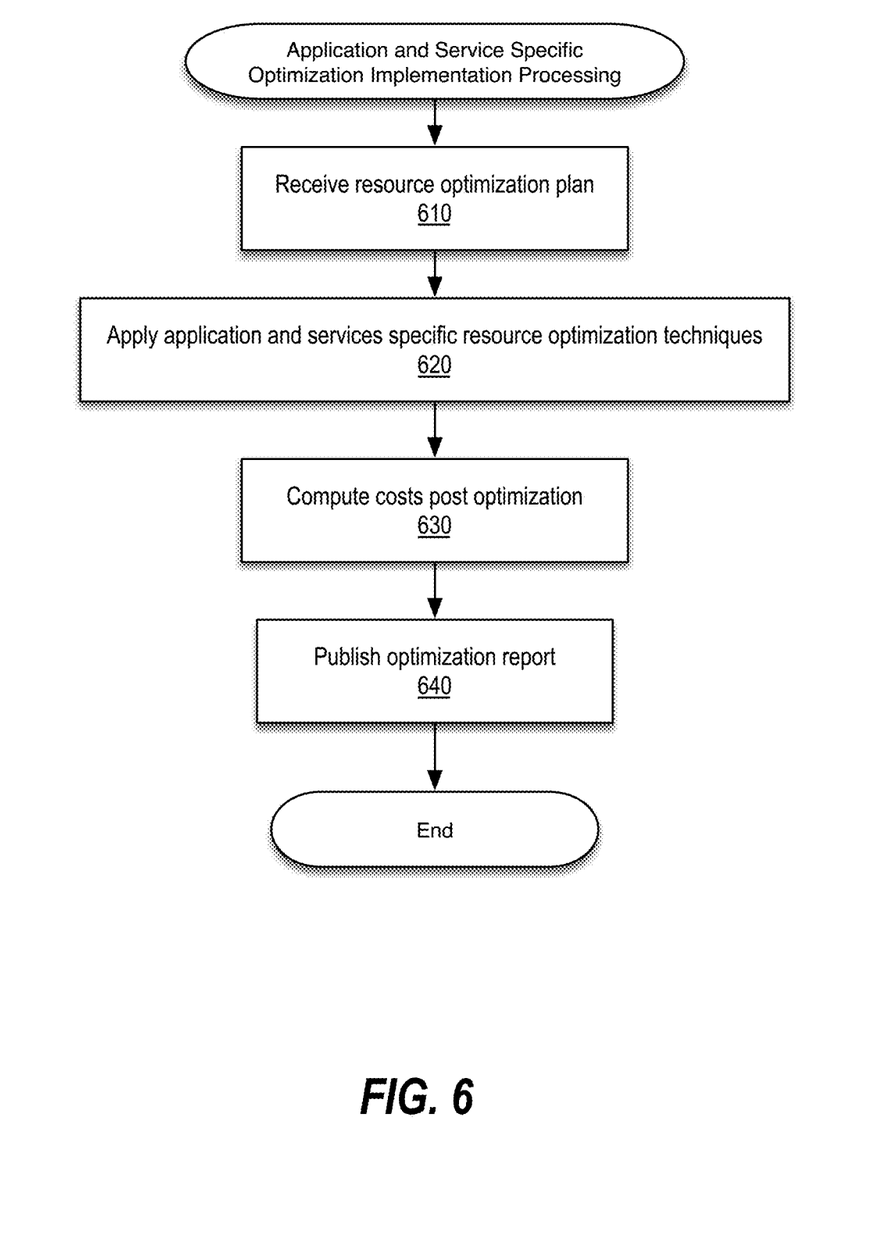
FIG. 6 is a flow diagram illustrating application and service specific optimization implementation processing in accordance with an embodiment.

FIG. 6 is a flow diagram illustrating application and service specific optimization implementation processing in accordance with an embodiment. According to one embodiment, the application and service specific optimization implementation processing is performed by a resource optimizer component (e.g., resource optimizer 127) of the resource optimization system. In one embodiment, the application and service specific optimization implementation processing is initiated responsive to receipt of approval of the resource optimization plan (or one or more recommendations contained therein) by the administrator.

At block 610, information regarding the resource optimization plan is received. According to one embodiment, the resource optimizer is invoked with this information as a parameter or retrieves this information from the results (e.g., resource optimization plan 126). of processing performed by the resource optimization plan generator. In one embodiment, those of the recommended resource optimizations that have been approved by the administrator may be tagged to identify which may now be implemented by the resource optimizer.

At block 620, application and services specific resource optimization techniques are applied. According to one embodiment, for each of the recommended resource optimizations that have been approved by the administrator, the resource optimizer programmatically provides appropriate directives to the public cloud via an API of the public cloud. Non-limiting examples of directives that may be provided to the public cloud include resizing of an instance, reconfiguration of snapshot frequency, moving of a backup destination to a more cost-effective location, re-deployment of an application to user reserved instances, and deletion of unused resources.

At block 630, post optimization costs are computed and at block 640, an optimization report may be published for review by the administrator(s). In one embodiment, this report represents the comparative report 128. This report may contain details regarding the applications subjected to resource optimization processing, configuration of the applications post optimization, application cost before and after implementation of the recommended optimizations and cost variance, and total cost of the optimized virtualized infrastructure deployment including variance from the pre-optimization virtualized infrastructure deployment.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 7:
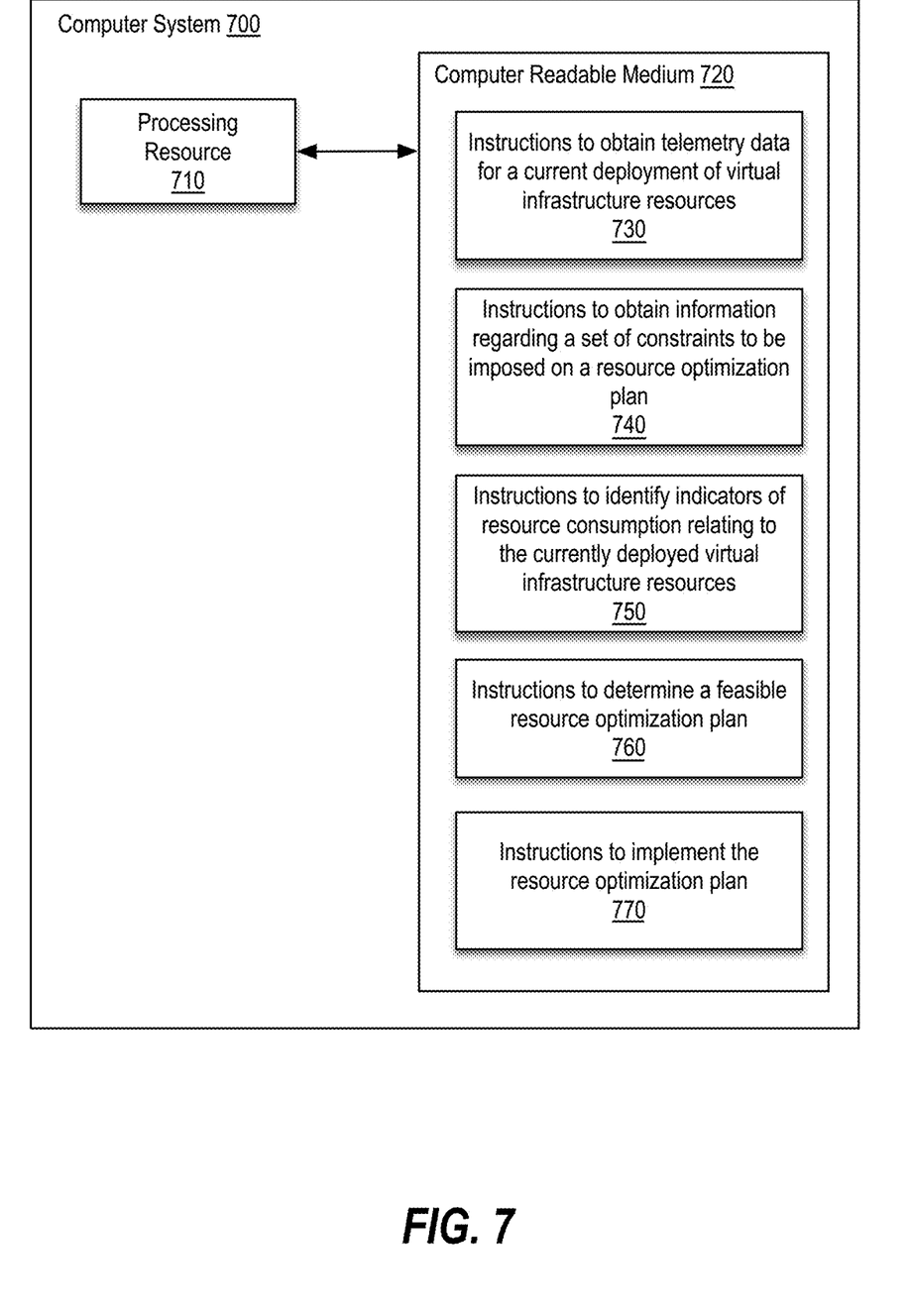
FIG. 7 is a block diagram of a computer system in accordance with an embodiment.

FIG. 7 is a block diagram of a computer system in accordance with an embodiment. In the example illustrated by FIG. 7, computer system 700 includes a processing resource 710 coupled to a non-transitory, machine readable medium 720 encoded with instructions to perform a proactive auto-scaling method in accordance with a private cloud embodiment. The processing resource 710 may include a microcontroller, a microprocessor, central processing unit core(s), an ASIC, an FPGA, and/or other hardware device suitable for retrieval and/or execution of instructions from the machine readable medium 720 to perform the functions related to various examples described herein. Additionally or alternatively, the processing resource 710 may include electronic circuitry for performing the functionality of the instructions described herein.

The machine readable medium 720 may be any medium suitable for storing executable instructions. Non-limiting examples of machine readable medium 720 include RAM, ROM, EEPROM, flash memory, a hard disk drive, an optical disc, or the like. The machine readable medium 720 may be disposed within the computer system 700, as shown in FIG. 7, in which case the executable instructions may be deemed "installed" or "embedded" on the computer system 700. Alternatively, the machine readable medium 720 may be a portable (e.g., external) storage medium, and may be part of an "installation package." The instructions stored on the machine readable medium 720 may be useful for implementing at least part of the methods described herein.

In the context of the present example, the machine readable medium 720 is encoded with a set of executable instructions 730-770. It should be understood that part or all of the executable instructions and/or electronic circuits included within one block may, in alternate implementations, be included in a different block shown in the figures or in a different block not shown.

Instructions 730, upon execution, cause the processing resource 710 to obtain telemetry data for a current deployment of virtual infrastructure resources. In one embodiment, instructions 730 may correspond generally to instructions for performing block 210 of FIG. 2.

Instructions 740, upon execution, cause the processing resource 710 to obtain information regarding a set of constraints to be imposed on a resource optimization plan. In one embodiment, instructions 740 may correspond generally to instructions for performing block 220 of FIG. 2.

Instructions 750, upon execution, cause the processing resource 710 to identify indicators of resource consumption relating to the currently deployed virtual infrastructure resources. In one embodiment, instructions 750 may correspond generally to instructions for performing block 230 of FIG. 2.

Instructions 760, upon execution, cause the processing resource 710 to determine a feasible resource optimization plan. In one embodiment, instructions 760 may correspond generally to instructions for performing block 240 of FIG. 2.

Instructions 770, upon execution, cause the processing resource 710 to implement the resource optimization plan. In one embodiment, instructions 760 may correspond generally to instructions for performing block 250 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
    obtaining telemetry data of a current deployment of virtual infrastructure resources within a current data center of a cloud provider that supports an existing service and an application deployed on the virtual infrastructure resources, wherein the telemetry data is collected over a period of time;
    obtaining information regarding a set of constraints to be imposed on a resource optimization plan, including application-specific and service-specific preferences and constraints;
    applying a deep learning algorithm to the telemetry data to identify a plurality of indicators of resource consumption relating to the currently deployed virtual infrastructure resources during the period of time, wherein the plurality of indicators of resources include a user workload pattern; and
    determining a resource optimization plan that is within the set of constraints and is based on a costing model associated with resources of an alternative data center of the cloud provider, the plurality of indicators of resource consumption, and costs associated with the current deployment;
    responsive to approval of the resource optimization plan, implementing the resource optimization plan by:
    reconfiguring the existing service and the application in accordance with the resource optimization plan; and
    re-deploying the application.

2. The computer-implemented method of claim 1, wherein the plurality of indicators of resource consumption include statistics relating to compute utilization, and a cloud services consumption pattern.

3. The computer-implemented method of claim 2, wherein statistics relating to compute utilization include average, minimum and maximum compute utilization during the period of time.

4. The computer-implemented method of claim 2, wherein the cloud services consumption pattern includes information regarding storage consumption and relational database services.

5. The computer-implemented method of claim 1, wherein said obtaining telemetry data and said identifying a plurality of indicators of resource consumption are performed on a periodic basis.

6. The computer-implemented method of claim 1, further comprising determining the costs associated with the current deployment, a current resource utilization, and an ideal cost by crawling the current deployment.

7. The computer-implemented method of claim 1, wherein the plurality of indicators of resource consumption include a life-span of each launched application.

8. The computer-implemented method of claim 1, wherein the plurality of indicators of resource consumption include information regarding backup creation and associated backup utilization data.

9. A non-transitory machine readable medium storing instructions executable by a processing resource of a computer system, the non-transitory machine readable medium comprising instructions to:
 obtain telemetry data of a current deployment of virtual infrastructure resources within a current data center of a cloud provider that supports an existing service and an application deployed on the virtual infrastructure resources, wherein the telemetry data is collected over a period of time;
 obtain information regarding a set of constraints to be imposed on a resource optimization plan, including application-specific and service-specific preferences and constraints;
 apply a deep learning algorithm to the telemetry data to identify a plurality of indicators of resource consumption relating to the currently deployed virtual infrastructure resources during the period of time, wherein the plurality of indicators include a current and historical consumption trend and a cost trend over time; and
 determine a resource optimization plan that is within the set of constraints and is based on a costing model associated with resources of an alternative data center of the cloud provider, the plurality of indicators of resource consumption and costs associated with the current deployment;
 responsive to approval of the resource optimization plan, implement the resource optimization plan by:
 reconfiguring the existing service and the application in accordance with the resource optimization plan; and
 re-deploying the application.

10. The non-transitory machine readable medium of claim 9, wherein the plurality of indicators of resource consumption include information regarding volume snapshot creation and associated snapshot utilization data.

11. The non-transitory machine readable medium of claim 9, wherein said obtaining telemetry data and said identifying a plurality of indicators of resource consumption are performed on a periodic basis.

12. The non-transitory machine readable medium of claim 9, further comprising determining the costs associated with the current deployment, a current resource utilization, and an ideal cost by crawling the current deployment.

13. The non-transitory machine readable medium of claim 9, wherein the plurality of indicators of resource consumption include a user workload pattern.

14. The non-transitory machine readable medium of claim 9, wherein the plurality of indicators of resource consumption include a data consumption pattern.

15. The non-transitory machine readable medium of claim 14, wherein the data consumption pattern is measured in terms of Input/Output Operations Per Second (IOPS).

16. The non-transitory machine readable medium of claim 9, wherein the plurality of indicators of resource consumption include a data usage pattern.

17. The non-transitory machine readable medium of claim 16, wherein the data usage pattern is indicative of hot data and cold data.

18. The non-transitory machine readable medium of claim 9, wherein the plurality of indicators of resource consumption include a provisioning model used to create instances.

19. The non-transitory machine readable medium of claim 18, wherein the provisioning model is indicative of whether the instances are reserved instances or spot instances.

* * * * *